(12) United States Patent
Stickel (10) Patent No.: US 11,646,593 B2
(45) Date of Patent: May 9, 2023

(54) CONFIGURABLE RECHARGEABLE BATTERY PACK

(71) Applicant: Metabowerke GmbH, Nuertingen (DE)

(72) Inventor: Wolfgang Stickel, Beuren (DE)

(73) Assignee: Metabowerke GmbH, Nuertingen (DE)

( * ) Notice: Subject to any disclaimer, the term of this patent is extended or adjusted under 35 U.S.C. 154(b) by 140 days.

(21) Appl. No.: 17/111,129

(22) Filed: Dec. 3, 2020

(65) Prior Publication Data
US 2021/0091588 A1 Mar. 25, 2021

Related U.S. Application Data

(63) Continuation-in-part of application No. 15/841,574, filed on Dec. 14, 2017, now Pat. No. 10,868,428.

(30) Foreign Application Priority Data

Dec. 15, 2016 (DE) .................. 10 2016 124 501.1

(51) Int. Cl.
| | |
|---|---|
| *H02J 7/00* | (2006.01) |
| *H02P 3/14* | (2006.01) |
| *H01M 10/42* | (2006.01) |
| *H01M 50/247* | (2021.01) |

(Continued)

(52) U.S. Cl.
CPC ............ *H02J 7/00712* (2020.01); *B25F 5/02* (2013.01); *H01M 10/425* (2013.01); *H01M 10/441* (2013.01); *H01M 50/247* (2021.01); *H02J 7/0013* (2013.01); *H02J 7/0047* (2013.01); *H02P 3/14* (2013.01); *H01M 2010/4271* (2013.01); *H01M 2220/30* (2013.01)

(58) Field of Classification Search
CPC ........................................................ H02J 7/00
See application file for complete search history.

(56) References Cited

U.S. PATENT DOCUMENTS

| | | | |
|---|---|---|---|
| 2015/0067362 A1 | 3/2015 | Sultenfuss et al. | |
| 2015/0194839 A1* | 7/2015 | Wojcik | H04Q 11/00 |
| | | | 320/108 |
| 2016/0197337 A1 | 7/2016 | Yau | |

FOREIGN PATENT DOCUMENTS

| | | |
|---|---|---|
| DE | 202013103445 U1 | 9/2013 |
| DE | 102012221133 A1 | 5/2014 |
| DE | 202015106271 U1 | 11/2015 |

(Continued)

OTHER PUBLICATIONS

Grant, Robert, "Advisory Action Regarding U.S. Appl. No. 15/841,574", dated Feb. 12, 2020, pp. 2, Published in: US.

(Continued)

*Primary Examiner* — Robert Grant
(74) *Attorney, Agent, or Firm* — Neugeboren O'Dowd PC (57) ABSTRACT

The invention relates to a battery-powered device, comprising a first controller, a first battery interface, and at least one electric consumer, wherein the first battery interface is configured to receive at least one configurable rechargeable battery pack for supplying energy to the at least one electric consumer; and wherein the first controller is embodied to receive at least one battery charging parameter at the first battery interface, and to reconfigure the at least one battery charging parameter by means of the first battery interface according to the power demands of the at least one electric consumer or according to a given user-specification.

11 Claims, 3 Drawing Sheets

(51) Int. Cl.
*H01M 10/44* (2006.01)
*B25F 5/02* (2006.01)

(56) References Cited

FOREIGN PATENT DOCUMENTS

| EP | 3032694 A1 | 6/2016 |
|---|---|---|
| WO | 2010060400 A2 | 7/2010 |
| WO | 2016131802 A1 | 8/2016 |

OTHER PUBLICATIONS

Neugeboren, Craig, "Response to Final Office Action Regarding U.S. Appl. No. 15/841,574", dated Feb. 3, 2020, pp. 12, Published in: US.

Grant, Robert, "Final Office Action Regarding U.S. Appl. No. 15/841,574", dated Dec. 3, 2019, pp. 13, Published in: US.

Grant, Robert, "Office Action Regarding U.S. Appl. No. 15/841,574", dated Mar. 27, 2020, pp. 11, Published in: US.

Grant, Robert, "Office Action Regarding U.S. Appl. No. 15/841,574", dated Jun. 13, 2019, pp. 17, Published in: US.

Neugeboren, Craig, "Response to Advisory Action Regarding U.S. Appl. No. 15/841,574", dated Mar. 10, 2020, pp. 11, Published in: US.

O'Dowd, Sean, "Response to Office Action Regarding U.S. Appl. No. 15/841,574", dated Jul. 13, 2020, pp. 7, Published in: US.

Neugeboren, Craig, "Response to Office Action Regarding U.S. Appl. No. 15/841,574", dated Sep. 5, 2019, pp. 10, Published in: US.

Deutsches Patent—Und Markenamt, "Office Action Issued in German Patent Application No. 10 2016 124 501.1", dated Nov. 17, 2020, pp. 9, Published in: DE.

European Patent Office, "Office Action Regarding Application No. 17 200 787.4", dated Jul. 16, 2019, pp. 4, Published in: EP.

Topalov, Angel, "Extended European Search Report Re Application No. 17200787.4", dated Dec. 20, 2017, pp. 6, Published in: EU.

German Patent and Trademark Office, "Search Report Re Application No. 102016124501.1", dated Aug. 25, 2017, pp. 9, Published in: DE.

\* cited by examiner

CONFIGURABLE RECHARGEABLE BATTERY PACK

PRIORITY

This application is a continuation in part of U.S. patent application Ser. No. 15/841,574, entitled "Configurable Rechargeable Battery Pack," filed Dec. 14, 2017, pending and assigned to the assignee hereof, which claims priority under 35 U.S.C. § 119 to German Patent Application No. 10 2016 124 501.1 filed Dec. 15, 2016. The details of both Applications are incorporated into the present application by reference and for all proper purposes.

FIELD OF THE INVENTION

The invention relates to a battery-powered device, a charging device, and a configurable rechargeable battery pack.

BACKGROUND OF THE INVENTION

A rechargeable battery pack means both a rechargeable battery having a single rechargeable battery cell (also called a secondary cell) and an interconnected package having a plurality of rechargeable battery cells. A rechargeable battery pack can also mean a storage unit for electrical energy that is not, or is not exclusively, formed electrochemically, that is to say a capacitor, for example.

Rechargeable batteries or rechargeable battery packs are well known and are used in the prior art as power sources for a multiplicity of applications.

As rechargeable batteries continually develop further, the total usable capacitance or energy density of a rechargeable battery pack today is sometimes so high that particular safety measures have to be taken in some cases during transport, storage and handling of the rechargeable battery packs. At the same time, it is usually necessary, for economic reasons, to arrange, in particular, transport and storage of such "high-power rechargeable battery packs" (e.g. rechargeable battery packs with a total capacitance of ≥100 watt hours) or of electrical devices comprising rechargeable battery packs of this kind in as uncomplicated a manner as possible.

To solve this problem, it is known to electrically interconnect rechargeable battery cells within rechargeable battery packs or else a plurality of rechargeable battery packs only when the rechargeable battery pack/packs are intended to be operated. Safe transport and safe storage of the rechargeable battery packs or electrical devices containing the rechargeable battery packs can therefore be possible, wherein at the same time a high total usable capacitance can be provided during operation as the sum of the interconnected individual capacitances.

A rechargeable battery pack of this kind is known, for example, from DE 20 2015 106 271 U1. The rechargeable battery pack with switchable total capacitance for supplying a mobile electrical device with electrical energy has at least two isolated cell packs having electrical terminals, wherein the electrical terminals of the cell packs can be electrically interconnected only by inserting the rechargeable battery pack into the device and/or by electrically connecting the rechargeable battery pack to the device for generating the total capacitance. DE 20 2015 106 271 U1 further provides for at least one switching element to be arranged for internally interconnecting the electrical terminals of the cell packs and for the at least one switching element to be able to be switched by inserting the rechargeable battery pack into the device and/or by electrically connection to the device.

Even though the transport and the storage of a rechargeable battery pack of this kind is basically safer since the cell packs are initially present isolated from one another and the total usable capacitance of the rechargeable battery pack during transport and storage is thus still relatively low, there is still a certain risk since the amount of energy stored in the initially still isolated cell packs is still high overall and therefore danger can still possibly result from the rechargeable battery pack(s) in the event of (severe) transport damage.

It would therefore be preferable, in principle, for the overall amount of energy stored in the rechargeable battery packs to be limited during transport and storage.

Charging devices for rechargeable battery packs, in which a desired state of charge can be prescribed as a criterion for ending the charging process, have now been disclosed. A charging device of this kind is known, for example, from WO 2010/060400 A2. Charging a rechargeable battery pack to just 80% of the total capacitance, for example, is also advantageous in terms of the lifetime of rechargeable battery packs, since it is known that the lifetime of rechargeable battery packs increases when they are not always charged fully.

Although the amount of energy fed into the rechargeable battery packs can therefore be limited or prescribed by the charging device during the charging process, it still cannot be guaranteed that a user or a manufacturer also actually only charges the rechargeable battery packs up to a charging limit that is considered to be safe. Accordingly, the legal regulations relating to the transport of hazardous goods are also only dependent on the total usable capacitance of the rechargeable battery pack and not on the actual state of charge.

SUMMARY OF THE INVENTION

In accordance with one aspect, a battery-powered device comprises a first controller, a first battery interface, and at least one electric consumer, wherein the first battery interface is configured to receive at least one configurable rechargeable battery pack for supplying energy to the at least one electric consumer, and wherein the first controller is embodied to receive at least one battery charging parameter at the first battery interface, and to reconfigure the at least one battery charging parameter by means of the first battery interface according to the power demands of the at least one electric consumer or according to a given user-specification.

In accordance with another aspect, a charging device comprises a second controller, and a second battery interface, wherein the second battery interface is configured to receive at least one configurable rechargeable battery pack to be charged by the charging device, and wherein the second controller is embodied to receive at least one battery charging parameter at the second battery interface, and to reconfigure the at least one battery charging parameter by means of the second battery interface according to a given user-specification.

In accordance with another aspect, a configurable rechargeable battery pack comprises an integrated battery management system and a data interface, wherein the battery management system has a data memory for storing at least one battery charging parameter and provides, at the data interface, the at least one battery charging parameter for an external device, and wherein the at least one battery charging parameter can be configured by means of an input at the data interface.

BRIEF DESCRIPTION OF THE DRAWING FIGURES

The figures respectively show preferred exemplary embodiments in which individual features of the present invention are illustrated in combination with one another. Features of one exemplary embodiment can also be implemented in a manner detached from the other features of the same exemplary embodiment and can accordingly be connected by a person skilled in the art to form further expedient combinations and sub-combinations with features of other exemplary embodiments.

DETAILED DESCRIPTION

The present invention is based on the object of providing a configurable rechargeable battery pack that permits safe transport and safe storage and at the same time can be used in a flexible manner.

The configurable rechargeable battery pack comprises an integrated battery management system (BMS) and a data interface. The data interface may comprise a mechanical user interface, a wired user interface and/or a wireless user interface, wherein the at least one battery charging parameter can be user-configured by means of the user interface.

A battery management system serves, in particular, to monitor and control a rechargeable battery pack and is sometimes also referred to as a power management system (PMS).

In the present case, the battery management system has a data memory for storing at least one rechargeable battery charging parameter, wherein the rechargeable battery charging parameter or parameters is or are provided at the data interface for an external device (e.g., for an external charging device or for a battery-powered device). In accordance with the invention, there is provision for the at least one rechargeable battery charging parameter to be able to be configured by means of an input at the data interface, in particular of the user interface.

As a result of the fact that the at least one rechargeable battery charging parameter can be configured by means of the user interface, it is possible for a standardized high-power rechargeable battery pack that can subsequently be configured in a flexible manner to be manufactured in mass production. It is possible for the rechargeable battery pack to be able to be configured by a user, who can preferably be an end consumer or a company, for example a manufacturer of the rechargeable battery pack. It is therefore possible to set parameters of the rechargeable battery pack by means of purely software-based measures with the hardware or the design remaining the same. Also, an automatic parameterization of the rechargeable battery pack by a connected electrical consumer or a charging device may be possible, as will be explained later.

The manufacture of a rechargeable battery pack of this kind can be economically advantageous since it is possible to manufacture high quantities of a single type of rechargeable battery pack, said high quantities being able to be scaled flexibly afterwards in a very simple manner. Thus, the rechargeable battery pack may be delivered with standard settings of the battery charging parameters. In the later application it can be useful to adapt these parameters to the power demands of the respective electrical consumer or to the intended use of the battery pack.

The battery management system can comprise arbitrary electrical circuits. A microcontroller, which is electrically connected to the data memory or has a data memory itself, can preferably be provided.

In terms of a data memory, in particular a semi-permanent memory, that is to say a non-volatile memory, the information of which can be modified during operation, can be provided. For example, an EPROM, EEPROM, Flash-EEPROM, FRAM or MRAM memory can be provided.

A data interface can mean an analog data interface and/or a digital data interface. In this case, in particular, a bus system can also be provided, wherein a plurality of data can be transmitted serially and/or in parallel by means of the data interface. There can also be provision for the data interface to be composed of a plurality of individual interfaces.

A plurality of user interfaces, for example two or three, can also be provided. The invention should not be understood to be restricted to the use of a single user interface.

The fact that the battery management system provides the at least one rechargeable battery charging parameter at the data interface for an external device may mean that the battery management system provides the at least one rechargeable battery charging parameter at the data interface permanently, provides it periodically or provides it upon request—for example by the external device.

In the presence of more than one rechargeable battery charging parameter, there can be provision, in particular, for the battery management system to provide, at the data interface, just a selection of the rechargeable battery charging parameters for the external device. There can be provision, for example, for just one of the rechargeable battery charging parameters to be provided for the external device.

There can also be provision for the rechargeable battery charging parameter or parameters to be provided for the external device in chronological order.

The fact that the at least one rechargeable battery charging parameter can be configured by means of an input at the data interface may mean that a user and/or the external device can arbitrarily set the at least one rechargeable battery charging parameter. However, there can also be provision for the user and/or the external device to select the at least one rechargeable battery charging parameter in stages, that is to say from a predefined table, for example, and thus configure it.

There can be provision, in particular when using a plurality of rechargeable battery charging parameters, not to configure all of the rechargeable battery charging parameters, but just a selection, for example just one rechargeable battery charging parameter.

The at least one rechargeable battery charging parameter can be configured in a digital, analog or mixed manner. The battery management system or parts thereof can therefore be embodied in an analog and/or digital manner, for example. The same applies to the data/user interface and the data memory.

In a particularly preferred embodiment, there can be provision for a total usable or chargeable capacitance of the rechargeable battery pack to be able to be configured by means of the input at the data interface.

A total usable or chargeable capacitance means a capacitance that does not necessarily correspond to the total capacitance of the rechargeable battery pack that can be achieved in terms of hardware. The total usable capacitance can be lower than or equal to the total capacitance of the rechargeable battery pack that can be achieved in terms of hardware, through the configuration of the at least one battery charging parameter.

As a result of the fact that the total usable capacitance of the rechargeable battery pack can be configured in a flexible manner, it is possible to ensure that even a "high-power rechargeable battery pack" can be transported and stored safely on account of the possibly limited total capacitance. The rechargeable battery pack can possibly be reconfigured again only later, when the rechargeable battery pack is intended to be used, as a result of which the actual total capacitance of the rechargeable battery pack becomes usable.

In particular, there can be provision for the rechargeable battery pack to be a rechargeable lithium-ion battery pack.

It is known that rechargeable lithium-ion battery packs, in particular, are dangerous to handle on account of their high energy density. For that reason, the invention is advantageous particularly for rechargeable battery packs of this kind.

However, the rechargeable battery pack according to the invention can, of course, also be a rechargeable nickel-metal hybrid battery, a rechargeable nickel-cadmium battery or a rechargeable lead-acid battery. In principle, the invention should not be understood to be limited to one particular type of rechargeable battery pack.

It is a further advantage of the invention that a rechargeable battery pack manufactured in principle as a high-power rechargeable battery pack can also be marketed with a lower total usable capacitance through an appropriate configuration. There can also be provision for a user to decide himself whether he would like to operate a rechargeable battery pack as a high-power rechargeable battery pack, that is to say with a very high capacitance, or as a long-life rechargeable battery pack, that is to say with, for example, just 80% of its maximum capacitance in terms of hardware.

A further advantage of terminating the charging process early may be lower heating of the rechargeable battery pack and of the external charging device.

In particular, there can be provision for the rechargeable battery charging parameters provided at the data interface to influence a characteristic curve of a charging process and/or to set the charging process.

It is known that an external charging device is able to identify a rechargeable battery pack connected thereto on the basis of the data provided by means of the data interface and thus selects a charging process or a charging characteristic curve that is particularly suitable for the present rechargeable battery pack.

As a result of the fact that the data provided at the data interface can now be configured, the rechargeable battery pack may emulate the presence of a weaker rechargeable battery pack where necessary. The external charging device therefore perceives a weaker rechargeable battery pack and independently selects an appropriate charging process or an appropriate charging characteristic curve. The external charging device therefore terminates a charging process earlier, for example, as a result of which the rechargeable battery pack cannot be fully charged, even though this would be possible based on the hardware. Finally, the rechargeable battery pack can be transported and stored, for example, in a relatively safe and therefore uncomplicated manner.

In one development of the invention, there can be provision for the charging process to be a constant-voltage charging process and/or a constant-current charging process, preferably an IU charging process or an IUoU charging process.

The IU charging process is also referred to as a CCCV (constant-current constant-voltage) charging process. Said process is a combination of the constant-current charging process and the constant-voltage charging process. In this case, the rechargeable battery pack is initially charged with a constant current; the rechargeable battery voltage at the rechargeable battery pack is continuously measured at the same time. When a specific end-of-charge voltage is reached, there is a switchover from the constant-current charging process to the constant-voltage charging process. In this second charging phase, constant voltage is therefore used for charging, wherein the charging current decreases continuously. The end-of-charge voltage is usually selected in such a way that, when the end-of-charge voltage is reached, the rechargeable battery pack is charged up to approximately 80% of its total capacitance. The remaining 20% of the charging process require a substantial portion of the total charging duration as a consequence of the charging current that steadily decreases from this point.

The IUoU charging process initially proceeds like the IU charging process, but after the charging has finished there is a switchover to what is known as trickle charging, wherein self-discharge of the rechargeable battery pack is also counteracted on a long-term basis, as long as the rechargeable battery pack remains in the external charging device.

The IU charging process and the IUoU charging process, respectively, may be usable particularly advantageously for charging a rechargeable lithium-ion battery pack.

The invention may also be usable for a pulse charging method when a rechargeable battery pack suitable for the pulse charging method is used. In principle, the invention can be used in combination with any charging process.

In one development of the invention, there can be provision for the at least one rechargeable battery charging parameter to be a rated voltage and/or an end-of-charge voltage ("charging end voltage") and/or a total capacitance.

In particular, the point at which the external charging device assumes an 80% charge of the rechargeable battery pack can usually be set by influencing the end-of-charge voltage. There can possibly also be provision for a rated voltage to be configured, wherein the external charging device infers an "apparent" total capacitance and end-of-charge voltage by means of the rated voltage. There can also be provision for the total usable capacitance to be specified directly.

There can also be provision for the rechargeable battery pack to transmit a complete charging curve to the external charging device, which the charging device then uses. A charging curve can mean, for example, a current-time curve, a voltage-time curve or a current-voltage curve.

Finally, there can be provision for the rechargeable battery pack itself to monitor the charging process, for example through the battery management system, and to transmit a charging duration to the external charging device, after which charging duration the charging process is to be terminated, and/or to transmit a signal to terminate the charging process when a defined state of charge has been reached, said state of charge being able to be configured by the rechargeable battery charging parameter or parameters. Also, a discharging process can be monitored by the battery pack in a similar manner.

A high compatibility with external devices can possibly be achieved by virtue of the fact that the rechargeable battery pack itself monitors the charging process and/or discharging process (e.g., when supplying energy to a battery-powered device) and transmits a fault signal to the external device when a state of charge or discharge defined by the configured rechargeable battery charging parameter or parameters is reached, as a result of which the external device assumes the occurrence of a fault and ends the charging process and/or discharging process. The rechargeable battery pack can, for example, simulate an excessive temperature of the rechargeable battery cells for this purpose.

There can also be provision for the at least one rechargeable battery charging parameter to be configured in such a way that the external charging device provides the charging process until for example 80% of the hardware-based total capacitance of the rechargeable battery pack has been reached by means of a constant-current charging process and then ends the charging process as soon as possible. This can be achieved, for example, by specifying the rechargeable battery charging parameters of rated voltage and end-of-charge voltage, for example by virtue of the rated voltage and the end-of-charge voltage being set to an identical or approximately identical value.

A charging process of this kind, in which the rechargeable battery pack is only charged to 80% of the total capacitance, can be advantageous since, firstly, the lifetime of the rechargeable battery pack can be increased by only charging to 80% of the total capacitance and charging to 80% by the constant-current charging process is possible in a relatively fast manner. Changing to a constant-voltage charging process can therefore possibly be omitted when the rechargeable battery charging parameter or parameters is or are configured appropriately.

In one development of the invention, there can be provision for the total usable capacitance of the rechargeable battery pack to be able to be configured in a plurality of stages, preferably comprising the ranges <100 watt hours (Wh) and ≥100 watt hours (Wh).

For example, there can be provision for the total usable capacitance of the rechargeable battery pack to be configured to 99 watt hours (Wh) before a transport or storage process. After termination of the transport or storage process, in particular before start-up of the rechargeable battery pack, the at least one rechargeable battery charging parameter can finally be configured in such a way that a total usable capacitance of the rechargeable battery pack of ≥100 watt hours (Wh) is possible. Using a limit of 100 watt hours (Wh) can be advantageous since, as is known, transport of the rechargeable battery pack with a total usable capacitance of <100 watt hours (Wh) is comparatively safe and is thus possible without any great complication.

In one development of the invention, there can be provision for the user interface to be access-protected by encryption and/or encoding and/or mechanical means and/or electrical means.

There can be provision for configuration of the rechargeable battery pack to be possible only by the manufacturer, supplier or another trustworthy group of individuals. It is therefore possible, for example, to preclude any user, that is to say a consumer of the rechargeable battery pack, for example, from configuring the rechargeable battery charging parameters. From an economic point of view, it can be advantageous, for example, to market high-power rechargeable battery packs having a lower total capacitance than is present in terms of hardware at a lower sale price in order to increase the quantities during manufacture.

There can also be provision for further rechargeable battery pack capacitance to be able to be released by a specialist shop for an additional price.

Mechanical means for access protection can mean, for example, a lead seal, a seal or a connection technique in which access is only possible with a special tool.

In one development of the invention, there can be provision for the user interface to be formed from at least one jumper and/or at least one switch and/or at least one DIP switch and/or at least one coding switch and/or at least one button (e.g., a single button only) and/or at least one pin and/or a programming interface and/or a wired or wireless interface.

This list is not exhaustive, of course. There can be provision for any established designs for forming the user interface.

In particular, a user interface with one or more buttons can be provided, by means of which button or buttons configuration by an encoded pulse input method (similar to a Morse code method) is possible. An encoded pulse input method to capture a user-specification for the battery charging parameter(s) can be particularly beneficial if the user interface comprises a single button only. Even a single button, for example, can therefore be sufficient to cover a large number of possible configurations.

There can also be provision for the user interface to be embodied as an adjustable analog electrical component (trimmer), for example a potentiometer or variable capacitor, or to comprise a component of this kind. There can therefore be provision for one or more rechargeable battery charging parameters to be able to be configured in an analog or continuous manner.

The user interface can be provided on the rechargeable battery pack at a protected location and/or a location that is difficult to access. The user interface can also be arranged within the rechargeable battery pack and can be accessible, for example, only after a housing part of the rechargeable battery pack has been opened.

In one development, there can be provision for the wireless interface to be embodied as a Bluetooth interface or WLAN interface or RFID interface.

The rechargeable battery charging parameters can be configured in a highly convenient way by means of wireless interfaces of this kind. There can also be provision for a combination of a plurality of wireless interfaces and/or a plurality of other conventional user interfaces (c.f. jumpers etc.).

In one development of the invention, there can be further provision for the data interface to be embodied as a serial interface.

Using a serial interface can be advantageous since the data interface can thereby be embodied in a compact manner and, for example, a single signal line can suffice for transmitting the data.

There can moreover be provision for the rechargeable battery charging parameters to be configured by the external device, for example by virtue of the fact that the user performs an input at the external device (e.g., at a mechanical and/or wired and/or wireless user interface of the external device), said input then being forwarded by means of the data interface to which the device is connected in this development.

There can furthermore be provision for the data interface and/or the user interface to be combined with the electrical terminals of the rechargeable battery pack, for example in such a way that the data can be transmitted via at least one supply line by a modulation technique.

There can be provision for the rechargeable battery pack to deliver an operating voltage of 18 volts or 36 volts. The rechargeable battery pack can be embodied, of course, for any voltages and currents.

There can be provision for the rechargeable battery pack to be able to be used for mobile battery-powered electrical devices. There can also be provision for the rechargeable battery pack to be able to be used in the automotive sector, in particular as an automobile battery of a motor vehicle having an internal combustion engine and/or as a battery for an electrically operated motor vehicle. The configurable rechargeable battery pack is especially suitable for use with an battery-powered electric power tool.

In principle, however, the configurable rechargeable battery pack can be suitable for any applications within electrical engineering in its entirety.

The invention also relates to a battery-powered device, comprising a first controller, a first battery interface, and at least one electric consumer, wherein the first battery interface is configured to receive at least one configurable rechargeable battery pack for supplying energy to the at least one electric consumer, and wherein the first controller is embodied to receive at least one battery charging parameter at the first battery interface, and to reconfigure the at least one battery charging parameter by means of the first battery interface according to the power demands of the at least one electric consumer or according to a given user-specification. As an example, the battery-powered device may be an electric power tool.

Due to the possibility to use a battery pack with different electric consumers and thus in different applications, it can be advantageous to automatically or manually adapt the battery pack to the respective application requirements. Thereby, the performance and/or lifetime of the battery pack can be optimized. In addition, the battery pack can be protected from overloading during use and/or the total usable (or chargeable) capacity of the battery pack can be increased or decreased just as required.

The electric consumer which is connected to the at least one rechargeable battery pack can be embodied to detect the type of battery pack and its charging parameters as provided at the common interface between the electric consumer and the battery pack. According to the specific demands of the electric consumer, the user and/or the electric consumer can reconfigure the battery pack by means of amending the values of the battery charging parameters in order to optimize the battery pack for use with the specific consumer/application.

There can be provision for the battery-powered device, wherein the battery charging parameter is reconfigured in order to take influence on subsequent charging processes for charging the at least one configurable rechargeable battery pack. In this way it can be ensured that the optimized battery charging parameters are also taken into account and retained later in the context of a charging process.

There can be provision for the battery-powered device, wherein the electric consumer is an electric motor. Especially if the electric consumer is an electric motor the rechargeable battery operating parameter can be reconfigured in consideration of the demands of a regenerative braking process of the electric motor.

In certain applications, for example in angle grinders, a regenerative braking process can be provided. Electrical braking currents are thereby fed back into the battery pack, which lead to a corresponding increase in voltage within its battery cells. If the battery pack has previously been charged up to its maximum end-of-charge voltage, voltage peaks can occur that are above the maximum permissible cell voltage of the battery cell, which may damage the battery cells. In addition, the battery management system of the battery pack might detect an error case and thus switch off the battery pack for protection. These problems can be avoided if the battery charging parameter(s) are reconfigured such that the battery pack will not be charged up to its maximum capacitance which can be achieved in terms of hardware during a subsequent charging process. Thus, a charging device can stop the charging process earlier due to the amended battery charging parameters, such that the battery pack will not be overloaded or such that the peak voltages which occur during a regenerative braking process do not exceed the maximum permissible cell voltages. An overvoltage reserve can be provided due to an accurate reconfiguration of the battery pack, e.g., during first use in the battery-powered device. Thereby, the lifetime of the rechargeable battery pack and maybe even of the battery-powered device can be improved.

The invention also relates to a charging device, especially an external charging device for the rechargeable battery pack, comprising a second controller, and a second battery interface, wherein the second battery interface is configured to receive at least one configurable rechargeable battery pack to be charged by the charging device, and wherein the second controller is embodied to receive at least one battery charging parameter at the second battery interface, and to reconfigure the at least one battery charging parameter by means of the second battery interface according to a given user-specification. According to the power requirement in the intended application or in the intended battery-powered device, the charging device can be used to optimize the battery charging parameters of the battery pack.

There can be provision for the charging device, wherein a total usable or total chargeable capacity of the rechargeable battery pack can be increased or decreased automatically or according to a user-specification during the first charging process inside the charging device. For example, the capacity of the rechargeable battery pack may be increased to a value over 100 watt hours (Wh) during the first charging process.

According to the invention, a change in the overall system through a specific parameterization of the battery pack's charging parameters(s) can be provided, which permanently or at least temporarily changes the behaviour of the battery pack within the battery-powered device or within the charging device and/or the behaviour of the battery-powered device/the charging device.

The invention also relates to a method for configuring a rechargeable battery pack, wherein at least one rechargeable battery charging parameter is configured by means of an input at a data interface of the rechargeable battery pack, and according to which method a battery management system provides, at the data interface of the rechargeable battery pack, the at least one rechargeable battery charging parameter for an external device. The external device, in many implementations, is a battery-powered device being powered by the rechargeable battery pack, or an external charging device for charging the rechargeable battery pack.

The invention also relates to a system consisting of a rechargeable battery pack and an external device for the rechargeable battery pack. The battery pack comprises a battery management system which is embodied to provide at least one battery charging parameter at a common data interface of the rechargeable battery pack with the external device. The external device sets a characteristic curve of a charging or discharging process on the basis of the at least one rechargeable battery charging parameter. The external device is further embodied to configure the at least one battery charging parameter by means of an input at the common data interface.

Features and advantages that have already been described above for the configurable rechargeable battery pack can, of course, also be transferred to the battery-powered device, the charging device, the method, or the system, provided this is not ruled out from a technical aspect.

Exemplary embodiments of the invention are described in more detail below with reference to the drawing.

Figure 1:
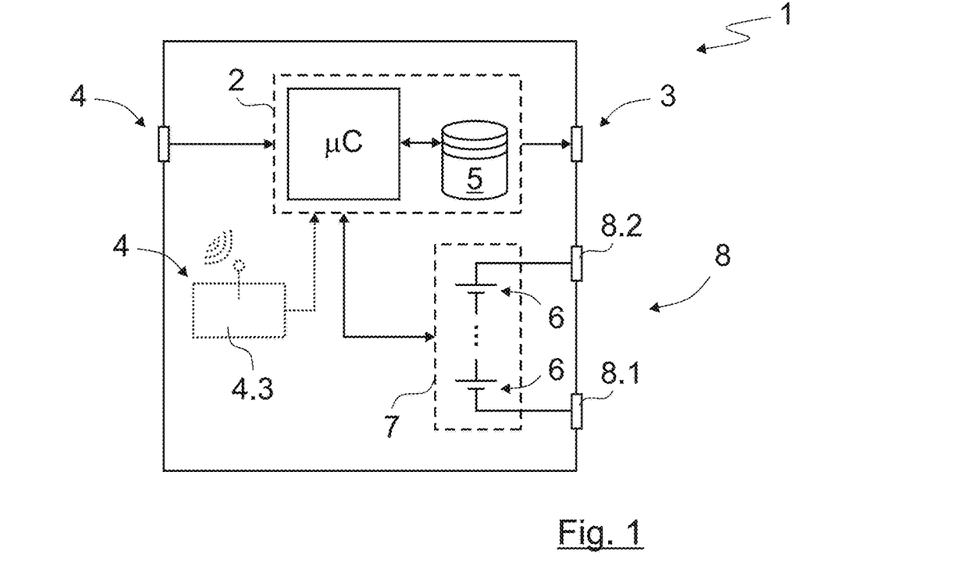
FIG. 1 shows a circuit diagram of a rechargeable battery pack that is configurable according to one or more aspects of the invention.

FIG. 1 schematically illustrates the circuit diagram of a rechargeable battery pack 1 according to the invention. The rechargeable battery pack 1 comprises an integrated battery management system 2 and a data interface 3 and a user interface 4 which may also be part of the data interface 3.

In the exemplary embodiment, the battery management system 2 is in the present case essentially a microcontroller μC. The battery management system 2 further comprises a data memory 5 for storing at least one rechargeable battery charging parameter. To this end, the microcontroller μC is connected to the data memory 5 for the purpose of reading and writing digital data. Of course, there can also be provision for an internal memory (not illustrated) of the microcontroller μC to be able to be used.

The at least one rechargeable battery charging parameter is provided by the battery management system 2 at the data interface 3 for an external device (not illustrated in FIG. 1). To this end, in particular a serial digital data interface 3 can be provided.

The external device can identify the rechargeable battery pack 1 on the basis of the data provided and is therefore preferably able to execute a charging or discharging process that is ideal for the ostensibly present rechargeable battery pack 1 or an ideal charging or discharging characteristic curve.

The at least one rechargeable battery charging parameter can be configured by means of an input at the data interface 3 and/or the user interface 4. In this case, there can be provision for the microcontroller μC of the battery management system 2—or an otherwise embodied logic system of the battery management system 2—to be instructed by means of the data interface 3 and/or the user interface 4 to modify the rechargeable battery charging parameter. However, there can also be provision for the at least one rechargeable battery charging parameter to be able to be changed directly in the data memory 5 by means of the data interface 3 and/or the user interface 4.

The user interface 4 can be, for example, at least one jumper 4.1 (cf. FIG. 3) and/or at least one switch and/or at least one DIP switch and/or at least one coding switch and/or at least one button and/or at least one pin and/or a programming interface 4.2 (cf. FIG. 3) and/or a wired and/or a wireless interface 4.3. Combinations thereof are also possible.

FIG. 1 depicts by way of example a wireless interface 4.3 using dashed lines in addition to the conventional user interface 4. The wireless interface 4.3 can be a Bluetooth interface or WLAN interface or RFID interface. It is therefore possible for the rechargeable battery pack 1 to be able to be configured even in a cableless manner by an external device (not illustrated). The external device can also be, for example, a PC, a tablet computer or a smartphone. For example, the battery charging parameters may be reconfigured from a user of the battery pack 1 by means of an application of a smartphone.

In particular, there can be provision for a total usable capacitance of the rechargeable battery pack 1 to be able to be configured by means of the input at the data interface 3 and/or at the user interface 4.

There can be provision for the rechargeable battery charging parameters provided at the data interface 3 to influence a characteristic curve of a charging process of an external charging device and/or to set the charging process.

The at least one rechargeable battery charging parameter can preferably be a rated voltage and/or an end-of-charge voltage $U_{LS}$ and/or a total capacitance. As a result, the total usable capacitance of the rechargeable battery pack 1 can preferably be configured in a plurality of stages, in particular comprising the ranges <100 watt hours (Wh) and ≥100 watt hours (Wh). A continuous configuration, for example by means of an analog user interface 4, is also possible.

The rechargeable battery pack 1 further comprises rechargeable battery cells 6, preferably one, two, three or four, possibly even one hundred or more, which are interconnected to form a series circuit 7. The rechargeable battery pack 1 has an electrical supply interface 8 comprising a cathode 8.1 and an anode 8.2. Electrical energy can be drawn from the rechargeable battery pack 1 or fed to the rechargeable battery pack 1 by means of the supply interface 8.

There can, of course, also be provision for a plurality of rechargeable battery cells 6 to be interconnected in parallel at a constant rechargeable battery voltage for the purpose of increasing the total capacitance. In particular, a group circuit, that is to say a combination of a series circuit and a parallel circuit, can also be provided.

The battery management system 2 can preferably also be provided for monitoring and/or controlling the rechargeable battery cells 6, for example with respect to an operating temperature and a state of charge. In particular, what is known as single-cell management can be provided. The battery management system 2 can be used for this purpose in a known manner. There can, of course, also be provision for an additional battery management system to be provided for monitoring the rechargeable battery cells 6. The battery management system 2 can be used for any additional tasks.

Further interfaces can, of course, also be provided on the rechargeable battery pack 1, said further interfaces not being illustrated here, however. For example, an interface can be provided, by means of which the rechargeable battery pack 1 can transmit a temperature signal and/or fault signal.

Figure 2:
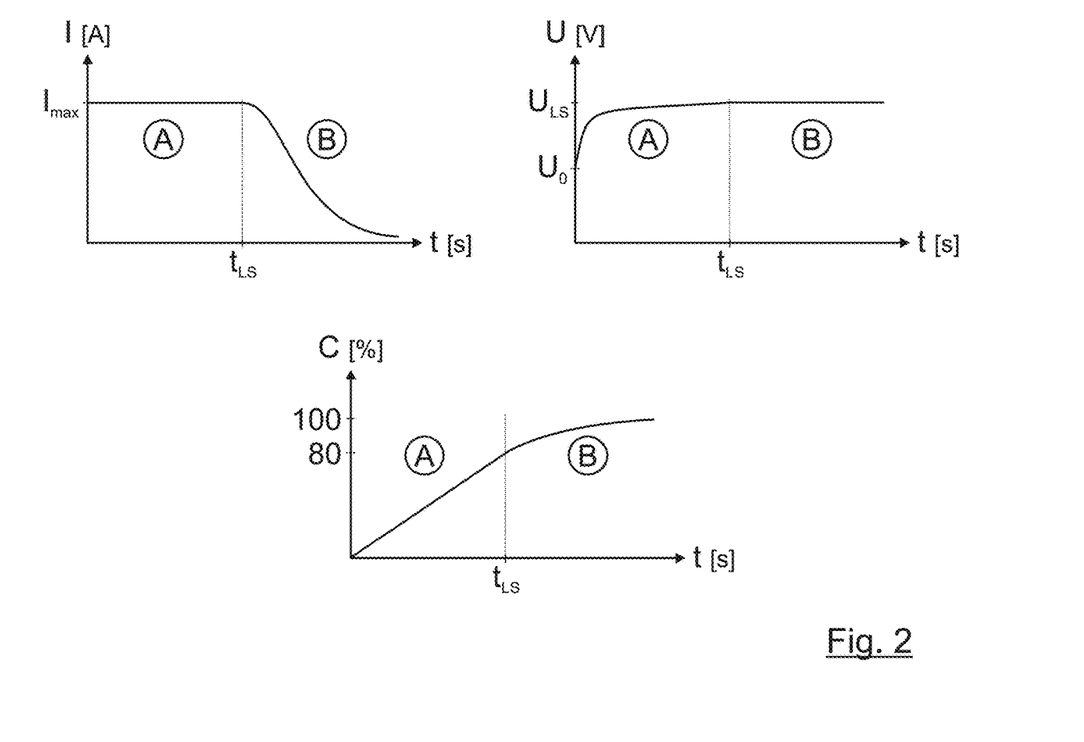
FIG. 2 shows exemplary charging characteristic curves of an IU charging process.

FIG. 2 illustrates schematically and by way of example three charging characteristic curves I(t), U(t), C(t) of an exemplary IU charging process.

The rechargeable battery pack 1 is preferably a rechargeable lithium-ion battery pack 1 in which preferably a combination of a constant-voltage charging process and a constant-current charging process can be used.

In the IU charging process, in a first phase A of charging, the rechargeable battery pack 1 is charged using a constant charging current $I_{max}$, until, at the point $t_{LS}$, a predefined end-of-charge voltage $U_{LS}$ is reached. To this end, the rechargeable battery voltage U(t) of the rechargeable battery pack 1 is monitored during the charging process by the external charging device. When the end-of-charge voltage $U_{LS}$ is reached, there is a change to a second charging phase B in which the charging voltage is now kept constant. From this point, the charging current I(t) continuously decreases since the difference between the charging voltage and the rechargeable battery voltage U(t) decreases as the charging time t progresses. Whereas, therefore, in the first charging phase A the charged rechargeable battery capacitance C(t) or the amount of energy increases approximately linearly, in the second charging phase B the charging curve C(t) passes over to a limited growth.

The end-of-charge voltage $U_{LS}$ is often selected in such a way that the external charging device charges the rechargeable battery pack 1 in the first charging phase A up to approximately 80% of its total capacitance. On account of the flattening charging curve, the second charging phase B in which the last 20% of the rechargeable battery pack 1 are charged takes up a comparatively large proportion of time. Furthermore, charging the rechargeable battery pack 1 to its hardware-based total capacitance during frequent charging significantly reduces the lifetime of the rechargeable battery pack 1. It can therefore be advantageous to regularly charge a rechargeable battery pack 1 only up to 80% of its total capacitance.

In one preferred embodiment of the invention, there can be provision for the rechargeable battery charging parameter that can be configured by means of the data interface 3 and/or the user interface 4 to be the end-of-charge voltage $U_{LS}$. As can be seen in the charging curves I(t), U(t), C(t) in FIG. 2, the end-of-charge voltage $U_{LS}$ sets the point $t_{LS}$ at which there is a switchover from the constant-current charging process to the constant-voltage charging process. In the event of a manipulation of the end-of-charge voltage $U_{LS}$, the external charging device therefore assumes that the total capacitance of the rechargeable battery pack 1 that is connected for charging is lower than is actually the case. The external charging device would therefore only charge the rechargeable battery pack 1 up to a desired state of charge, which can be defined by means of the end-of-charge voltage $U_{LS}$. What can also possibly be achieved in the event of simultaneous manipulation of a further rechargeable battery charging parameter, for example the rated voltage, is that the external charging device immediately stops the charging process after the first charging phase A has ended without passing into the second charging phase B. This can lead to an enormous time saving during charging.

Figure 3:
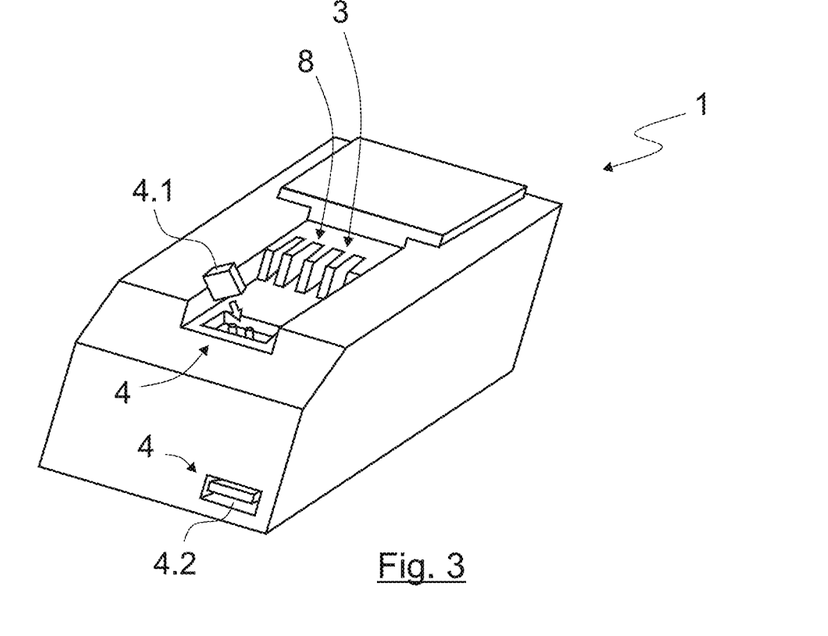
FIG. 3 shows an isometric illustration of a rechargeable battery pack that is configurable according to an aspect of the invention.

FIG. 3 illustrates by way of example an isometric illustration of a configurable rechargeable battery pack 1.

The rechargeable battery pack 1 comprises a mechanical coding, as a result of which said rechargeable battery pack can be connected only to external charging devices or to electrical devices that are to be supplied with energy, said devices having an appropriately corresponding coding for receiving the rechargeable battery pack 1. A supply interface 8, into which the data interface 3 is also integrated, is also illustrated.

Two examples of a user interface 4 are illustrated. Firstly, a programming interface 4.2 is present in the form of a USB port 4.2 on the front side of the rechargeable battery pack 1. It is possible to conveniently access the battery management system 2 and/or the data memory 5 and/or the at least one rechargeable battery charging parameter by means of said programming interface 4.2.

There can be provision for the user interface 4 to be access-protected by encryption and/or encoding and/or mechanical means and/or electrical means.

In the case of the programming interface 4.2, encryption and/or encoding in particular can be provided. It is thus only possible to access a configuration interface of the battery management system 2 by means of an access code, for example.

A user interface 4 consisting of two pins arranged so as to be recessed in the rechargeable battery pack 1 and a jumper 4.1 is illustrated as a further example. The pins (and the inserted jumper 4.1) are in this case fitted at a mechanically well-protected location.

There can, for example, be provision for a user to select one of two configurations of the rechargeable battery pack 1 by selectively inserting the jumper 4.1. A plurality of pins and/or a plurality of jumpers can, of course, also be provided, as a result of which the number of selectable configurations is larger.

In particular, a structurally identical rechargeable battery pack 1 can be reconfigured to different variants by configuring the at least one rechargeable battery charging parameter. It is thus possible to market a long-life variant and a power variant, for example. There can also be provision for the user, that is to say preferably the end consumer, to decide himself which variant he prefers.

It is also possible to reconfigure the battery charging parameter by means of the data interface 3. Thus, also the external device, e. g., a battery-powered device or a charging device, can configure the battery charging parameter, as will be explained next.

Figure 4:
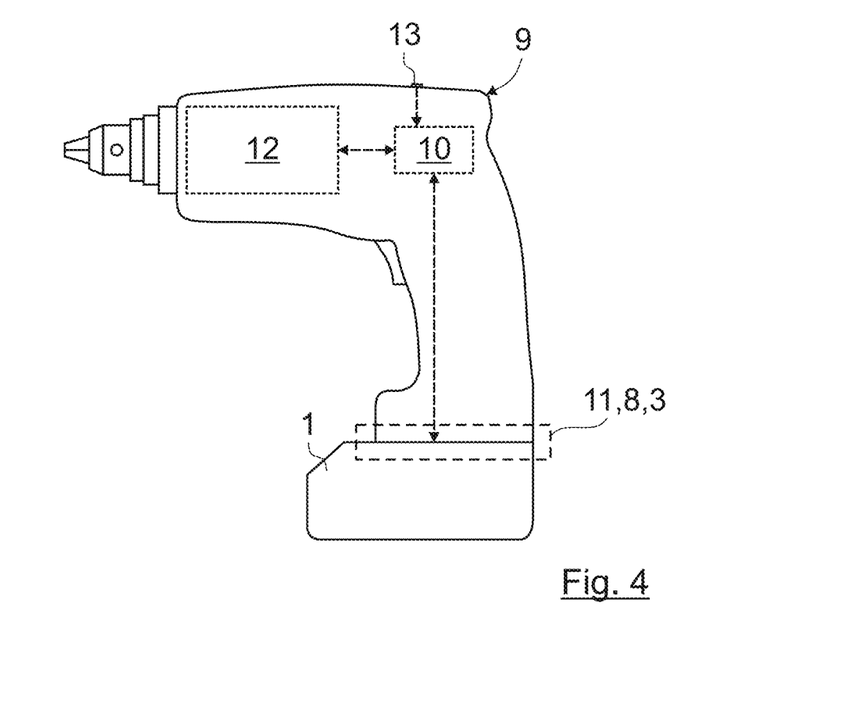
FIG. 4 shows an exemplary battery-powered device according to an embodiment.

FIG. 4 shows an exemplary battery-powered device 9 according to the invention. In the application example, the battery-powered device 9 is an exemplary electric power tool (a rechargeable driller). The battery-powered device 9 comprises a first controller 10, a first battery interface 11, and an electric consumer 12, each shown with dashed lines.

The first battery interface 11 is configured to receive the rechargeable battery pack 1 for supplying energy to the electric consumer 12. The first controller 10 is embodied to receive at least one battery charging parameter of the rechargeable battery pack 1 at the first battery interface 11, and to reconfigure the at least one battery charging parameter by means of the first battery interface 11 according to the specific power demands of the electric consumer 12 or according to a given user-specification. The user-specification can, e.g., be received from a mechanical user interface 13 (for example a button), a wired interface, or a wireless interface of the battery-powered device 9 but can also be received from the user interface 4 of the rechargeable battery pack 1 itself.

The battery charging parameter may then be reconfigured via the battery-powered device 9 in order to take influence on a subsequent charging process, for example, to increase or decrease a total chargeable capacitance of the rechargeable battery pack 1 which is lower than a maximum capacitance of the rechargeable battery pack 1 that can be achieved in terms of hardware. The battery charging parameter can especially be reconfigured in consideration of the demands of a regenerative braking process when the electric consumer 12 is implemented as an electric motor in order to avoid braking-induced voltage peaks to overload the battery cells 6.

Figure 5:
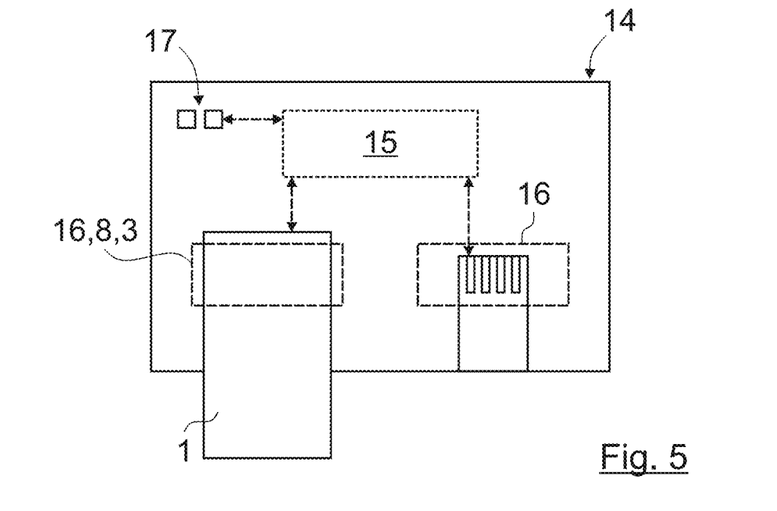
FIG. 5 is a block diagram depicting an exemplary external charging device.

FIG. 5 shows an external charging device 14, comprising a second controller 15, and a second battery interface 16 (each shown with dashed lines in the figure). The second battery interface 16 is configured to receive the rechargeable battery pack 1 for charging in the charging device 14. In the application example, the charging device 14 is embodied to receive two rechargeable battery packs 1. However, the charging device 14 can also be embodied to receive only a single rechargeable battery pack 1 or even more than two rechargeable battery packs 1. The second controller 15 is embodied to receive at least one battery charging parameter of the rechargeable battery 1 from the second battery interface 16, and to reconfigure the at least one battery charging parameter by means of the second battery interface 16 according to a given user-specification. The user-specification can, e.g., be received from a mechanical user interface 17 (for example at least one button), a wired interface, or a wireless interface of charging device 14 but can also be received from the user interface 4 of the rechargeable battery pack 1 itself.

The charging device 14 can be embodied to reconfigure the battery charging parameter such that the total usable or total chargeable capacitance of the rechargeable battery pack 1 is decreased or increased.

Figure 6:
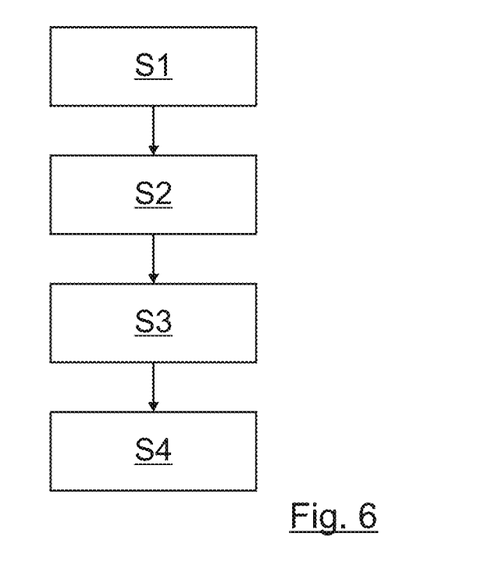
FIG. 6 is a flowchart depicting a method that may be traversed in connection with embodiments disclosed herein.

An exemplary method to reconfigure a rechargeable battery pack 1 is illustrated in FIG. 6. In a first step S1, a predefined rechargeable battery pack 1 is connected to an external device, e.g., the battery-powered device 9 or the charging device 14. The rechargeable battery pack 1 may have standard settings for the battery charging parameter, e. g., a reduced maximum chargeable/usable capacitance for safe transportation, or a maximum chargeable/usable capacitance which can be achieved in terms of hardware.

During a second step S2, the external device 9, 14 receives the battery charging parameters from the rechargeable battery pack 1 at the respective battery interface 11, 16, for example when the external device 9, 14 is powered on.

During a third step S3, the external device 9, 14 may reconfigure the battery charging parameters according to the demands of the respective application/electric consumer 12 and/or according to a user-specification.

Subsequently, in a fourth step S4, the reconfigured rechargeable battery pack 1 might be charged by a charging device 14. The charging device 14 receives the reconfigured battery charging parameters and executes a corresponding charging process.

The method described above with reference to FIG. 6, and the other methods described herein, may (at least in part) be executed by hardware, in processor executable instructions encoded in a non-transitory machine readable medium (e.g., flash memory), or as a combination of the two. For example, the first controller 10, and the second controller 15 may be realized by a microcontroller µC or embodied logic in much the same way as the battery management system 2. When implemented by a processor-based system (e.g., a microcontroller µC) that includes a processor that executes instructions, the nonvolatile memory is non-transitory memory that functions to store (e.g., persistently store) data and machine readable (e.g., processor executable) code including executable code that is associated with effectuating the methods described herein. It is also contemplated that the battery management system 2, the first controller 10, and/or the second controller 10 may be implemented by embedded logic realized by an application specific integrated circuit (ASIC), a field programmable gate array (FPGA) or other programmable logic device, discrete gate or transistor logic, discrete hardware components, or any combination thereof designed to perform the functions described herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A battery-powered device, comprising:
a first controller;
a first battery interface; and
at least one electric consumer,
wherein the first battery interface is configured to receive at least one configurable rechargeable battery pack for supplying energy to the at least one electric consumer;
wherein the first controller is configured to receive at least one battery charging parameter at the first battery interface, and to reconfigure the at least one battery charging parameter via the first battery interface according to power demands of the at least one electric consumer or according to a given user-specification,
wherein the first controller is configured to use the at least one battery charging parameter to affect subsequent charging processes for charging the at least one configurable rechargeable battery pack, and
wherein the first controller is configured to use the at least one battery charging parameter to define a total chargeable capacitance of the at least one configurable rechargeable battery pack, the total chargeable capacitance being lower than a maximum capacitance of the configurable rechargeable battery pack that can be achieved in terms of hardware.

2. The battery-powered device according to claim 1, wherein the battery-powered device includes an electric power tool housing that surrounds the first controller, the first battery interface, and the at least one electric consumer.

3. The battery-powered device according to claim 1, wherein one of the at least one electric consumer is an electric motor, and wherein the first controller is configured to reconfigure the at least one charging parameter in consideration of the power demands of a regenerative braking process of the electric motor.

4. The battery-powered device according to claim 1, wherein the battery-powered device further comprises one or more of a mechanical user interface, a wired user interface, and a wireless user interface, being embodied to receive the user-specification from a user of the battery-powered device.

5. A charging device, comprising:
a first controller; and
a first battery interface,
wherein the first battery interface is configured to receive at least one configurable rechargeable battery pack to be charged by the charging device;
wherein the first controller is configured to receive at least one battery charging parameter at the first battery interface, and to reconfigure the at least one battery charging parameter via the first battery interface according to a given user-specification, and
wherein the first controller is configured to reconfigure the at least one battery charging parameter to define a total chargeable capacitance of the at least one configurable rechargeable battery pack, the total chargeable capacitance being lower than a maximum capacitance of the at least one configurable rechargeable battery pack that can be achieved in terms of hardware.

6. The charging device according to claim 5, wherein the charging device further comprises one or more of a mechanical user interface, a wired user interface, and a wireless user interface, being embodied to receive the user-specification from a user of the charging device.

7. A battery-powered device, comprising:
a first controller;
a first battery interface; and
at least one electric consumer,
wherein the first battery interface is configured to receive at least one configurable rechargeable battery pack for supplying energy to the at least one electric consumer;
wherein the first controller is configured to receive at least one battery charging parameter at the first battery interface, and to reconfigure the at least one battery charging parameter via the first battery interface according to power demands of the at least one electric consumer or according to a given user-specification;
wherein one of the at least one electric consumer is an electric motor; and
wherein the first controller is configured to reconfigure the at least one battery charging parameter in consideration of the power demands of a regenerative braking process of the electric motor.

8. The battery-powered device according to claim 7, wherein the battery-powered device includes an electric power tool housing that surrounds the first controller, the first battery interface, and the at least one electric consumer.

9. The battery-powered device according to claim 7, wherein the first controller is configured to use the at least one battery charging parameter to affect subsequent charging processes for charging the at least one configurable rechargeable battery pack.

10. The battery-powered device according to claim 9, wherein the first controller is configured to use the at least one battery charging parameter to define a total chargeable capacitance of the at least one configurable rechargeable battery pack, the total chargeable capacitance being lower than a maximum capacitance of the at least one configurable rechargeable battery pack that can be achieved in terms of hardware.

11. The battery-powered device according to claim 7, wherein the battery-powered device further comprises one or more of a mechanical user interface, a wired user interface, and a wireless user interface configured to receive the user-specification from a user of the battery-powered device.

* * * * *